US008493869B2

(12) United States Patent
Udupi et al.

(10) Patent No.: US 8,493,869 B2
(45) Date of Patent: Jul. 23, 2013

(54) DISTRIBUTED CONSTRAINTS-BASED INTER-DOMAIN NETWORK TRAFFIC MANAGEMENT

(75) Inventors: Yathiraj Udupi, Sunnyvale, CA (US); Wei Sun, San Jose, CA (US); Ganesh Rajan, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 337 days.

(21) Appl. No.: 12/581,284

(22) Filed: Oct. 19, 2009

(65) Prior Publication Data
US 2011/0090791 A1    Apr. 21, 2011

(51) Int. Cl.
*G08C 15/00*    (2006.01)

(52) U.S. Cl.
USPC ............ 370/238; 370/231; 370/235; 370/468

(58) Field of Classification Search
USPC ................. 370/230, 231, 235, 238, 252, 253, 370/351, 389, 390, 468; 709/229, 239
See application file for complete search history.

(56) References Cited

U.S. PATENT DOCUMENTS

| 6,141,325 | A  | * | 10/2000 | Gerstel ........................ | 370/238 |
| 7,599,349 | B2 |   | 10/2009 | Vasseur et al. | |
| 2006/0039391 | A1 | * | 2/2006 | Vasseur et al. ................ | 370/409 |
| 2007/0121503 | A1 | * | 5/2007 | Guo et al. ..................... | 370/230 |
| 2007/0201513 | A1 | * | 8/2007 | Anderson et al. ............. | 370/468 |
| 2007/0230363 | A1 | * | 10/2007 | Buskens et al. ............... | 370/252 |

OTHER PUBLICATIONS

Ossama Younis et al., Constraint-Based Routing in the Internet: Basic Principles and Recent Research, IEEE Communications Surveys and Tutorials, vol. 5, Issue 1, Third Quarter, Aug. 2003.
L. Hanzo et al., A Survey of QoS Routing Solutions for Mobile Ad hoc Networks, Wireless Communications and Mobile Computing, vol. 2, Issue 1, Jul. 2007.
Matthew Caesar et al., Design and Implementation of a Routing Control Platform, Proceedings of the 2nd Conference on Symposium on Networked Systems Design and Implementation, vol. 2, pp. 15-28, May 2005.
Shigang Chen et al., An Overview of Quality-of-Service Routing for the Next Generation High-Speed Networks: Problems and Solutions, IEEE Network Magazine, vol. 12, Issue 6, Nov./Dec. 1998.
A. Farrel et al., A Path Computation Element (PCE)-Based Architecture, Network Working Group, Request for Comments 4655, The Internet Society, Aug. 2006.

(Continued)

*Primary Examiner* — Luat Phung
(74) *Attorney, Agent, or Firm* — Edell, Shapiro & Finnan LLC

(57) ABSTRACT

A distributed inter-domain constraints-based routing technique is provided herein. A problem solving request is sent to nodes in a plurality of network domains that have a potential path between a source node and the destination node. The problem solving request includes one or more constraints associated with a routing function for traffic between the source node and destination node. Local path solutions are generated at nodes in domains that receive the problem solving request, where the local path solutions representing possible paths from a previous neighbor network domain to a next neighbor network domain that satisfy the one or more constraints. Based on the local path solutions, a determination is made as to whether there is at least one path from the source node to the destination node that satisfies the one or more constraints.

19 Claims, 8 Drawing Sheets

OTHER PUBLICATIONS

G. Apostolopoulos et al., QoS Routing Mechanisms and OSPF Extensions, Network Working Group, Request for Comments 2676, The Internet Society, Aug. 1999.

Cisco Release 11.1 CC, Quality of Service Policy Propagation via Border Gateway Protocol, Sep. 2007.

Micah Bartell, et al., Effective BGP Policy Control; sample chapter provided courtesy of Cisco Press, Jan. 23, 2004, from the book BGP Design and Implementation.

J. P. Vasseur, et al., Path Computation Element (PCE) Communication Protocol (PCEP), Network Working Group, Internet-Draft, Nov. 17, 2008.

* cited by examiner

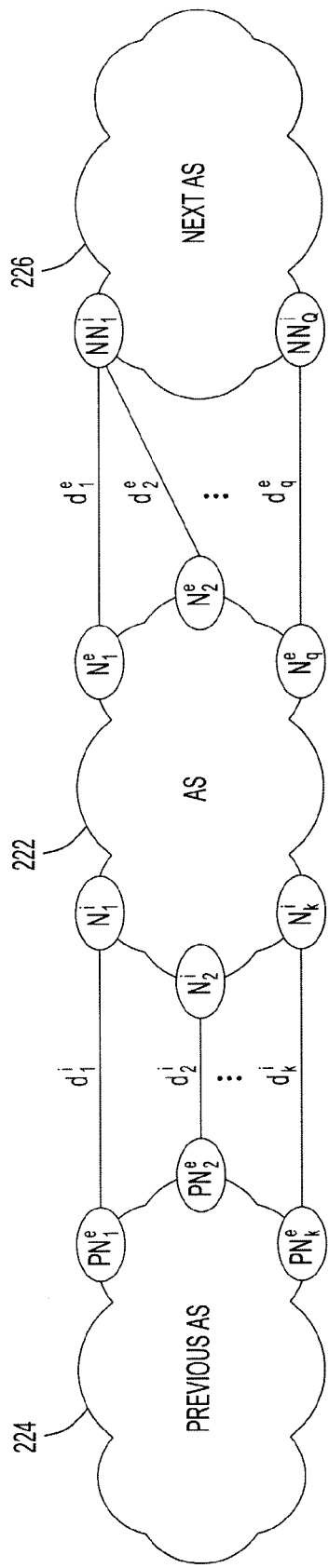
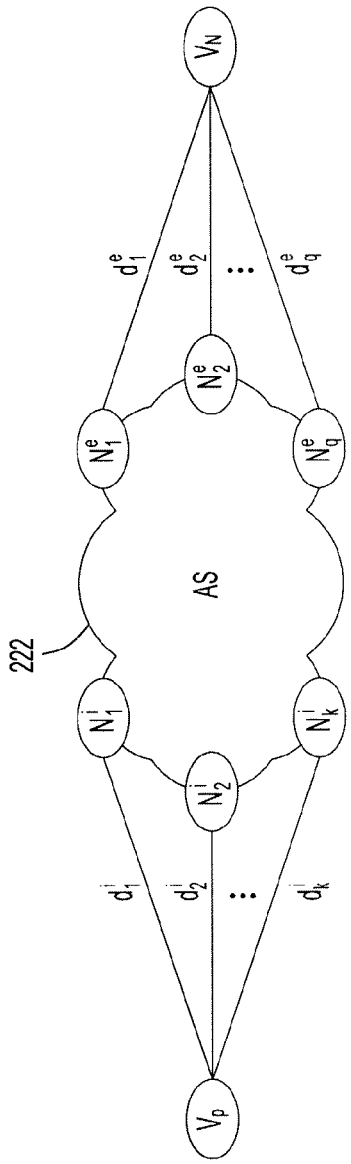
FIG.5
FIG.6

DISTRIBUTED CONSTRAINTS-BASED INTER-DOMAIN NETWORK TRAFFIC MANAGEMENT

TECHNICAL FIELD

The present disclosure relates to traffic routing management in data communication networks.

BACKGROUND

Constraints-based traffic engineering involves traffic routing in a network where routing or path computation decisions are made to determine whether certain constraints are satisfied for a path. Constraints can include administrative policies, quality of service (QoS) requirements (that relate to performance requirements, load balancing, and scalability factors), network resource availability, and so on. QoS constraints include total path delay, available bandwidth, loss rate, hop count, and any other user defined costs. These constraints-based routing mechanisms include policy routing (where the constraints are administrative policies) and QoS routing (involving QoS constraints). There are two categories of constraints-based problems: constraint satisfaction problem (CSP) and constraint optimization problem (COP). A CSP continues to look for solutions until one solution is found that satisfies all the specified constraints. A COP continues to look for all possible solutions or all possible solutions found until a pre-configured time period has expired, and then determines the "best" solution based on an optimization criterion or criteria.

There are two broad categories of routing: intra-domain routing and inter-domain routing. Current inter-domain routing protocols, such as the border gateway protocol (BGP), are based on the shortest path from the source to destination as well as on policy-based preference or other configuration values. As for intra-domain routing, currently most QoS requirements are handled by traffic engineering (TE) approaches via manual configuration or the multiple protocol label switching (MPLS) switching technologies. A path satisfying the required QoS constraints can be set up using protocols such as the resource reservation protocol (RSVP). Then, routing is explicitly carried out via switching technologies such as MPLS.

A constraints-based routing computation technique that can rely on distributed local path solution computations has greater flexibility and scalability.

BRIEF DESCRIPTION OF THE DRAWINGS

FIG. 5 is a diagram illustrating an example of a generalized network topology to be considered when a problem solving request is received.

FIG. 6 is a diagram illustrating an abstraction of the network topology shown in FIG. 5 to simplify the representations of a previous neighbor network domain and a next neighbor network domain.

DESCRIPTION OF EXAMPLE EMBODIMENTS

Overview

A distributed inter-domain constraints-based routing technique is provided herein. A problem solving request is sent to a plurality of network domains that have a potential path between a source node and a destination node. The problem solving request includes one or more constraints associated with a routing function for traffic between the source node and the destination node. Local path solutions are generated in domains that receive the problem solving request, where the local path solutions represent possible paths from a previous neighbor network domain to a next neighbor network domain that satisfy the one or more constraints (and also any local domain constraints). Based on the local path solutions, a determination is made as to whether there is at least one path from the source node to the destination node that satisfies the one or more constraints.

The techniques described herein allow for selection of routes based on up-to-date network usage and resource availability and can better respond to network condition changes. To improve scalability, these techniques utilize a hybrid structure: at the inter-domain level it is a distributed system in that a traffic request is solved collectively by multiple domains together. At the intra-domain level, these techniques involve a centralized system with a number of dedicated solvers.

Example Embodiments

Figure 1:
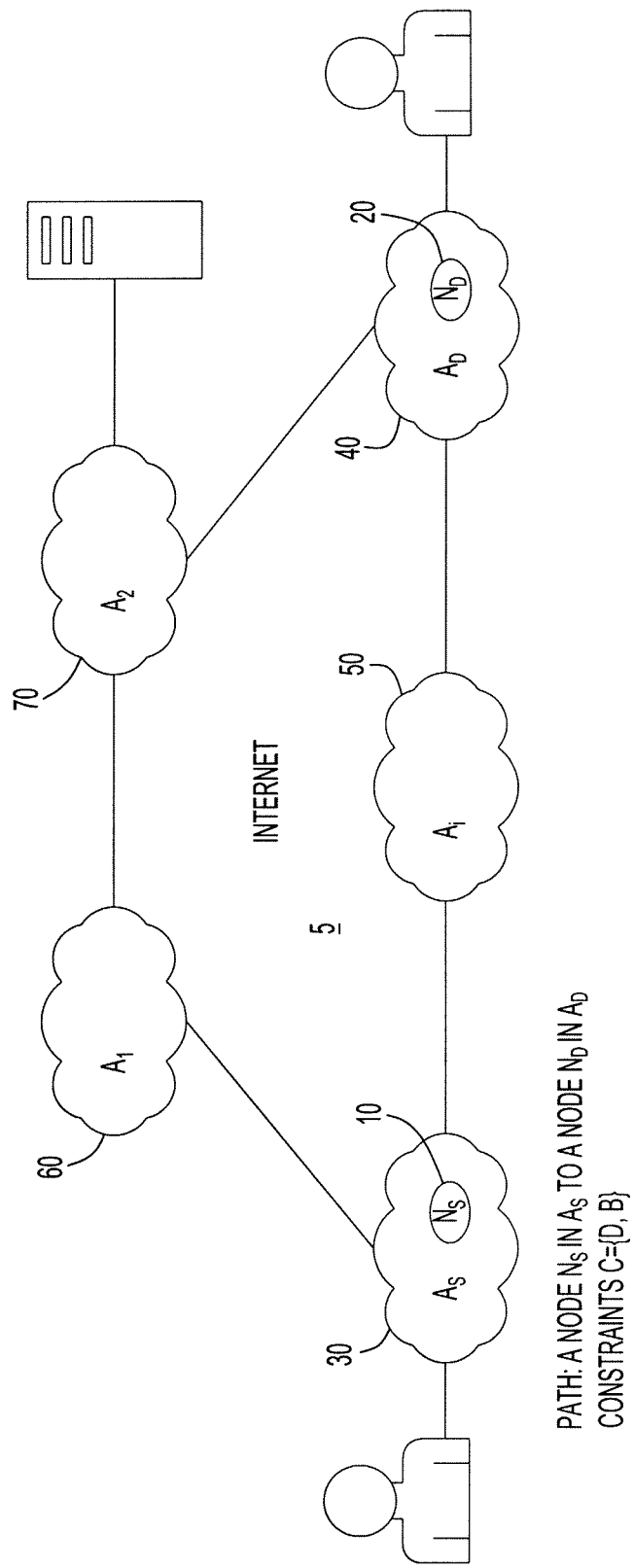
FIG. 1 is a block diagram of a communication network comprising multiple domains through which a source node in a source domain solves a routing problem for traffic to a destination node in a destination domain using distributed constraints-based inter-domain routing techniques.

Techniques are provided herein for solving inter-domain routing using a distributed constraints-based approach. Reference is made first to FIG. 1, which shows a distributed constraints-based inter-domain routing example where a source node ($N_S$) 10 is to route data to a destination node $N_D$ 20. Ns 10 is in a first or source network domain $A_S$ 30 and $N_D$ 20 is in a second or destination network domain $A_D$ 40. FIG. 1 shows an intermediate domain $A_i$ 50 between domains $A_S$ 30 and $A_D$ 40, and also network domains $A_1$ 60 and $A_2$ 70 between domains $A_S$ 30 and $A_D$ 40. The network domains 30-70 can be said to be part of a larger data network, i.e., the Internet, shown at reference numeral 5.

A constraints-based inter-domain routing problem can be stated as follows: "Determine one or more paths from a source node $N_S$ in domain $A_S$ to a destination node $N_D$ in domain $A_D$ that satisfies a set $C=\{D, B\}$ of constraints, where D is the total allowed delay, and B is the total required bandwidth allocation from $N_S$ to $N_D$". When considered as a constraints satisfaction problem (CSP), it is desired to find the first path that satisfies all the constraints. When the problem is considered as a constraints optimization problem (COP), the source node returns the best path of a plurality of the available satisfying paths, based on an optimization criterion or criteria.

In general, the source domain $A_S$ 30 may have "N" neighbor network domains. Using information shared by other domains via an inter-domain routing protocol, such as the border gateway protocol (BGP), the source domain $A_S$ 30 knows about for example, "M" paths to the destination domain $A_D$ 40. For each of the known "M" path vectors, a set of intermediary domains are obtained between the source and the destination domains.

An inter-domain constraints-based routing problem involves a set of problem solving requests, with each request having a source and a destination, each belonging to different domains, and a set of constraints. Note that a domain here is meant to be general in that it may refer to a single autonomous system, an area within an autonomous system, or a fixed set of autonomous systems or areas.

The solution for the above problem includes a set of paths, one or more potential satisfying paths for each request from a source to a destination satisfying the constraints provided. In accordance with the distributed approach described herein, each domain is considered to have one or more local constraints-based solvers that are centralized in nature and can solve for any local intra-domain routing requests. Each domain solver is aware of the intra-domain network topology, and the link attributes such as delay, available bandwidth, etc. Each domain solver is aware of a plurality of (e.g., all) the edge connecting links and their attributes with their neighbor domains. The intra-domain network topology is visible within the domain. Each domain solver knows the routes to other domains in the network topology. The constraints-based solvers can leverage routing protocols such as BGP and open shortest path first (OSPF) to know the routes. Each domain solver can communicate with the domain solvers in other domains.

The techniques described herein are derived for a scenario which involves a single request, and where the domain refers to a single autonomous system. Although the techniques presented herein are for an inter-autonomous system constraints-based routing scenario, they are applicable for any inter-domain case, where a domain can be an autonomous system, an area within an autonomous system, or sets of autonomous systems or areas. Also, for the sake of simplicity, the set of constraints comprises only two constraints, namely delay and bandwidth. However, the constraints can be very general to include, but not limited to, any QoS and policy constraints. In addition to these constraints contained in the request, each domain may have its own local constraints that are not communicated with other domains. The internal topology, local constraints and policies of each of the individual domains need not be shared with other domains while computing an intra-domain path between its upstream and downstream neighboring domains. Also, each domain may have a single centralized solver or potentially have a set of distributed solvers that work together to provide aggregated solutions.

The source domain of the traffic, and in particular, the source node (or another node in the source domain), acts as a master. The master divides the problem by sending a problem solving request to nodes in a plurality of (e.g., all) the domains (including the source domain and the destination domain) that have a potential path between the source node in the source domain and the destination node in the destination domain. The functions described herein to generate and send a problem solving request and to receive and analyze the local path solution responses, may be performed by a network element, e.g., the source node itself, that also is configured to forward data in the network. Alternatively, these functions may be performed by a computing element connected to the network and configured only to monitor traffic in the network and which does not forward network traffic, but which otherwise has the necessary computing capabilities as described herein. When nodes in the plurality of the domains return their local results, the results are aggregated and then analyzed to determined whether there is at least one path from the source node to the destination node that satisfies the given one or more constraints. Nodes in the plurality of the domains (including the source domain and the destination domain) solve the request locally first and return their local results. The results may be returned to the master, i.e., source node in the source domain, or to a different network node element that is configured to perforin the aggregation and analysis. The elements in the other domains that receive and respond to the problem solving request may be network elements that are also capable of forwarding traffic in the network (e.g., nodes in the domain), or may be computing elements that are configured only to monitor traffic in the network (and not to forward traffic) but which have the necessary computing capabilities.

Figure 2A:
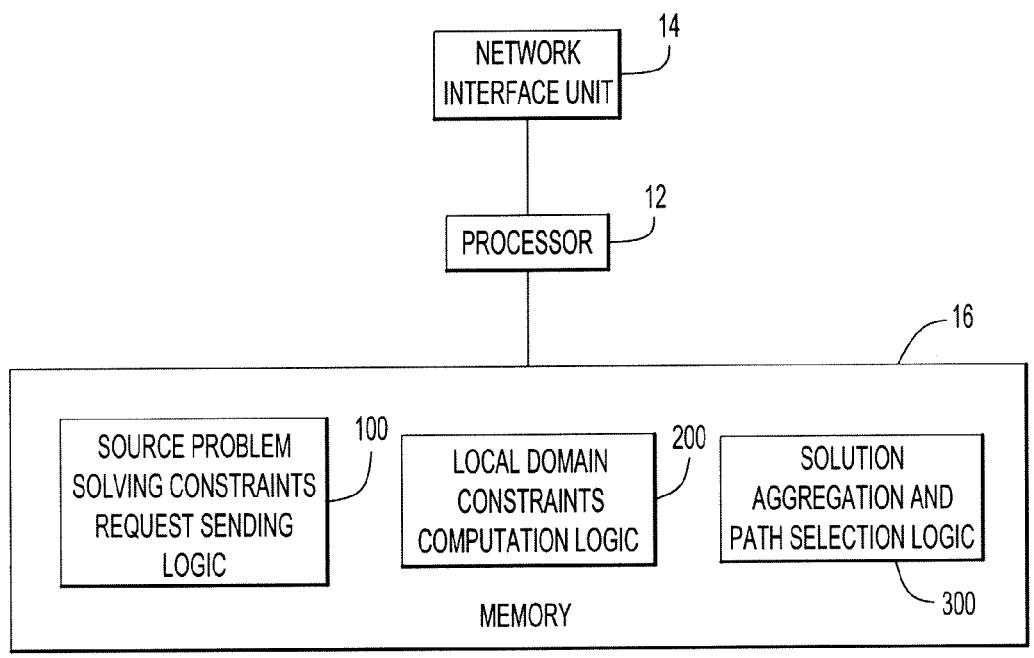
FIG. 2A is a block diagram of a network node element that is configured to perform the routing computation functions as part of the distributed constraints-based inter-domain routing techniques.

Turning now to FIG. 2A, a block diagram is shown of a network node element that is configured to serve as a node capable of acting as a solver and as a master node as well. Thus, the block diagram shown in FIG. 2A may represent a block diagram of the source node 10 and, with the exception of two software modules or functions described herein, a block diagram of a destination node 20 or any node in any domain that is capable of responding to a problem solving request. Examples of such network elements are network routers; however other devices may also be configured to perform these functions. Such a network node element can also be a pure computational element, acting solely as a solver, and not configured to forward packets in the network. To this end, the network node element comprises a processor 12, a network interface unit 14 and memory 16. The processor 12 is, for example, a microprocessor, a microcontroller, a digital signal processor, etc. The network interface unit 14 is device that is configured to enable communications over a network according to any of a variety of networking protocols.

The memory 16 is a tangible processor readable or computer readable memory that stores or encoded with instructions that, when executed by the processor 12, cause the processor 12 to perform functions described herein. For example, the memory 16 is encoded with source problem solving constraints request generation and sending logic 100, local domain constraints computation logic 200 and solution aggregation and path selection logic 300. While FIG. 2A shows a processing environment comprising a data processor 12 that executes software stored in memory 14, an alternative processing environment is a fixed data processing element, such as an application specific integrated circuit (ASIC) that is configured, through fixed hardware logic, to perform the functions of the logic 100, 200 and 300. Yet another possible data processing environment is one involving one or more field programmable logic devices, or a combination of fixed processing elements and programmable logic devices. In one form, the logic 100, 200 and 300 may be embodied in a processor readable medium that is encoded with instructions for execution by a processor that, when executed by the processor, are operate to cause the processor to perform the functions described herein in connection with logic 100, 200 and 300.

Any network node element that is capable of responding to a problem solving request is configured with the local domain constraints computation logic 200. Any network node element that is capable of generating and sending problem solving requests is configured with the logic 100. Further still, any network node element that is capable of receiving local path solutions, aggregating those solutions and selecting a path (or storing one or more acceptable paths) is configured with the logic 300. Thus, a given network node element may be configured with all three logic blocks 100, 200 and 300, two of the logic blocks 100, 200 and 300 or only one of the logic blocks 100, 200 and 300.

Figure 2B:
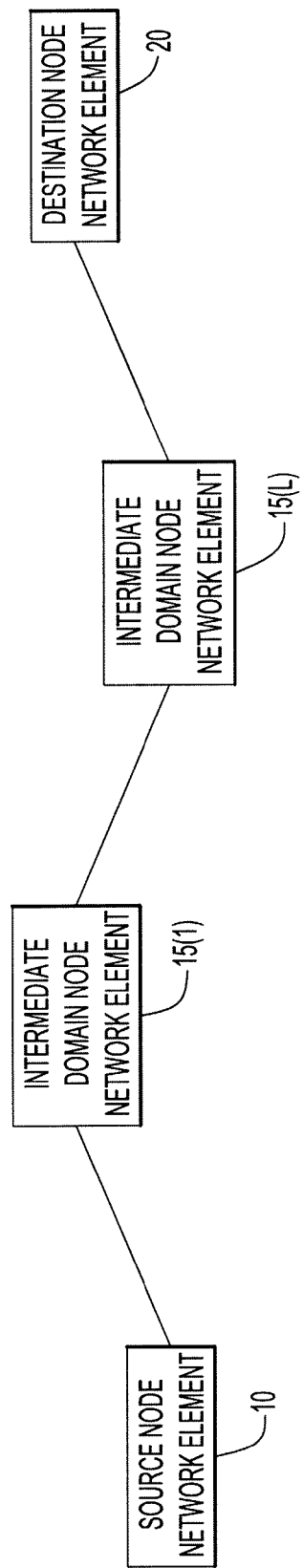
FIG. 2B is a block diagram of a system of network elements that may be configured to participate in the distributed constraints-based inter-domain routing techniques.

FIG. 2B illustrates a system comprised of a plurality of network elements, including source node 10, destination node 20, and one or more nodes 15(1)-15(L) in intermediate domains. In this system example, source node 10, destination node and each of the nodes 15(1)-15(L) are configured with the logic 200. The source node 10, if it is to send the problem solving request, is configured with the logic 100. The source node 10 may also be configured with the logic 300. However, any other network element or other computing element may be configured with the logic 300 and thus receives the local path solutions for analysis as explained herein.

Figure 3:
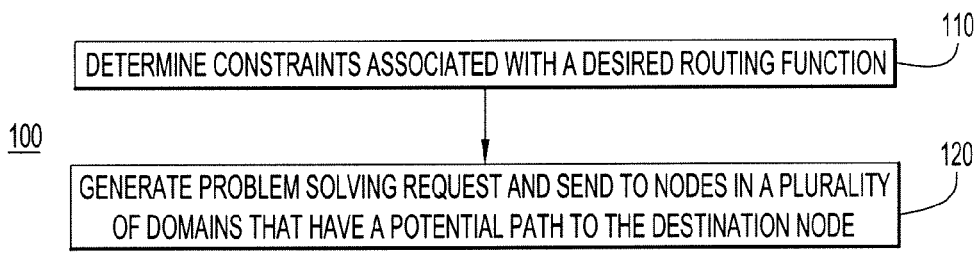
FIG. 3 is a flow chart for problem solving constraints request generation and sending logic that is performed by a network node element in a source domain for a routing problem with respect to a destination domain.

Turning now to FIG. 3, a flow chart is shown for the source problem solving constraints request generation and sending logic 100. The logic 100 is used by a network node element in the source domain to share a constraints set C={D, B} to a plurality of network domains that it knows might have a potential path to the destination node. In one embodiment, the logic 100 is performed by the source node, e.g., $N_S$ 10 in FIG. 1. At 110, the network node determines the one or more constraints that are to be used for the desired routing function of data from the source node in the source domain to the destination node in the destination domain. For example, the constraints may consist of a total allowed time delay D and a required bandwidth B. At 120, the network node generates and sends a problem solving request message to nodes in a plurality of (e.g., all) the network domains that have a potential path to the destination node. The problem solving request message comprises one or more constraints associated with the routing function for the data to be sent from the source node to the destination node. The domains which receive the problem solving request message are now aware of the source and the destination of the posed routing problem, as well as the associated constraints. The node that sends the problem solving requests determines in advance a plurality of (e.g., all) the possible paths between the source node and the destination node using an inter-domain routing protocol, such as BGP.

An example of pseudo-code for the function 120 is as follows.
1 For each path P from source domain $A_S$ to destination domain $A_D$ known to source domain (e.g., via BGP)
2 For each domain Ai in the path P
3 SEND ($N_S$, $A_S$, $N_D$, $A_D$, C, path P)
4 End For
5 End For In other words, the problem solving request message is sent, for each path from the source node to the destination node, to nodes in each network domain that is in the corresponding path. The problem solving request message contains an identifier of the source node, an identifier of the destination node, an identifier of the first network domain, an identifier of the second network domain, constraints criteria comprising total allowed delay D and total required bandwidth B from the source node to the destination node for the path, and an identifier of the path.

Figure 4:
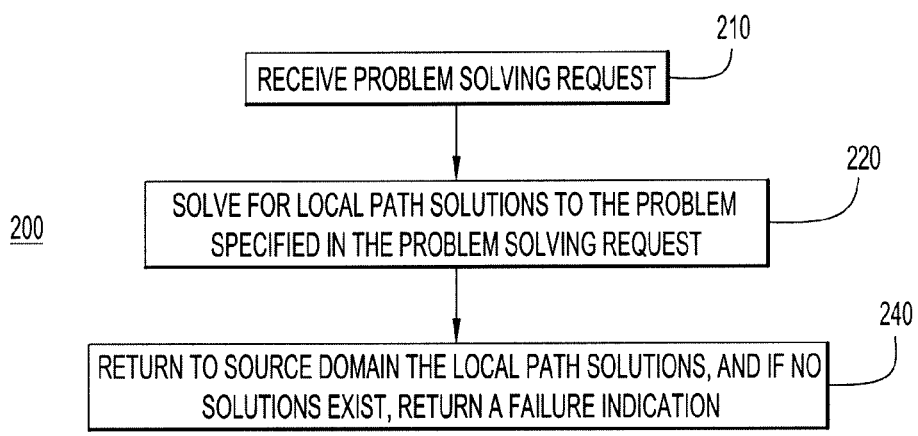
FIG. 4 is a flow chart for local domain constraints computation logic that is performed by a network node element in response to receiving a problem solving request.

Referring now to FIGS. 4-6, the local domain constraints computation logic 200 is described. The logic 200 controls how a node in an intermediary domain (which may include the source domain and the destination domain) responds to a received problem solving request.

At 210 in the flow chart of FIG. 4, a node in a given autonomous system (AS) shown at 222 in FIG. 5 receives a problem solving request receives the problem solving request. Nodes $N_1^i, N_2^i, \ldots, N_k^i$ are ingress edge nodes of the AS 222 with respect to egress edge nodes $PN_1^e, PN_2^e, \ldots, PN_k^e$ of a previous network neighbor domain 224. Nodes $N_1^e, N_2^e, \ldots, N_q^e$ are egress edge nodes of AS 222 with respect to ingress edge nodes $NN_1^i, NN_2^i, \ldots, NN_q^i$ of the next neighbor domain 226. The values $d_1^i, d_2^i, \ldots, d_k^i$ are respectively ingress edge link delays between the egress edge nodes of the previous neighbor network domain 224 and the ingress edge nodes of AS 222, and $d_1^e, d_2^e, \ldots, d_k^e$ are respective egress edge link delays between the egress edge nodes of AS 222 and the ingress edge nodes of the next neighbor network domain 226. It should be understood that in some network topologies, a given domain may have multiple previous neighbor domains and multiple next neighbor domains with respect to a problem solving request from a source domain to a destination domain.

At 220, when a node receives a problem solving request, it solves locally for possible paths from its previous neighbor domain 224 to the next neighbor domain 226 as determined by the path "P" specified in the request. These possible paths are called local path solutions. The node in the domain 222 solves this local problem by considering the two neighboring domains 224 and 226 as two virtual nodes $V_P$ and $V_N$, respectively, as illustrated in FIG. 6. The link delays between local domain and its neighboring domains remain the same. A local node can introduce additional constraints which are specific to its local domain, as explained above. Using this abstraction or model, the problem solving request is transformed into finding the paths between nodes $V_P$ and $V_N$ that satisfy constraints "C#", where "C#" comprises the one or more constraints specified in the problem solving request and also any local constraints associated with the local domain in which the node that receives the request resides. That is, local path solutions are generated for possible paths from the previous neighbor network domain that is modeled as a single virtual network node, e.g., virtual node $V_P$, and for possible paths to the next neighbor network domain that is modeled is a single virtual network node, e.g., virtual node $V_N$.

Referring back to FIG. 4, at 240, the node returns the local path solutions it computed at 220, and if no local path solution is found, then it returns a failure indication. A node can have a pre-configured parameter that deter mines the number of local path solutions that it can return. In this way, the overall flow of the process need not wait a potentially long period of time for a node to determine all possible local path solutions.

An example of pseudo-code for the functions 220 and 240 is as follows.
1 Solve for a plurality (e.g., all) local solutions to the problem: Path $V_P$ to $V_N$ using constraints "C#".
2 If the request can be solved, return location path solutions to the source domain, where a solution is a tuple of the form [Edge link to previous domain $A_{(i-1)}$, $\{d^i/2+d_{(local)}+d^e/2\}$, $b_{(local)}\}$, Edge link to next domain $A_{(i-1)}$], where b(local) is the local available bandwidth, $d^i$ is the corresponding ingress edge link delay, $d^e$ is the corresponding egress edge link delay, and $d_{(local)}$ is the delay for the corresponding local path.
3 Otherwise, return failure to the source domain.

Thus, the logic 200 is configured to be executed at each node that receives a problem solving request, and to generate a plurality of possible local path solutions for possible paths from the previous neighbor network domain to the next neighbor network domain. The local path solution comprises, for example, data representing an edge link to the previous neighbor network domain, a constraints value set comprising local available bandwidth, ingress edge link delay, egress edge link delay and local path delay and an edge link to the next neighbor network domain.

Figure 7:
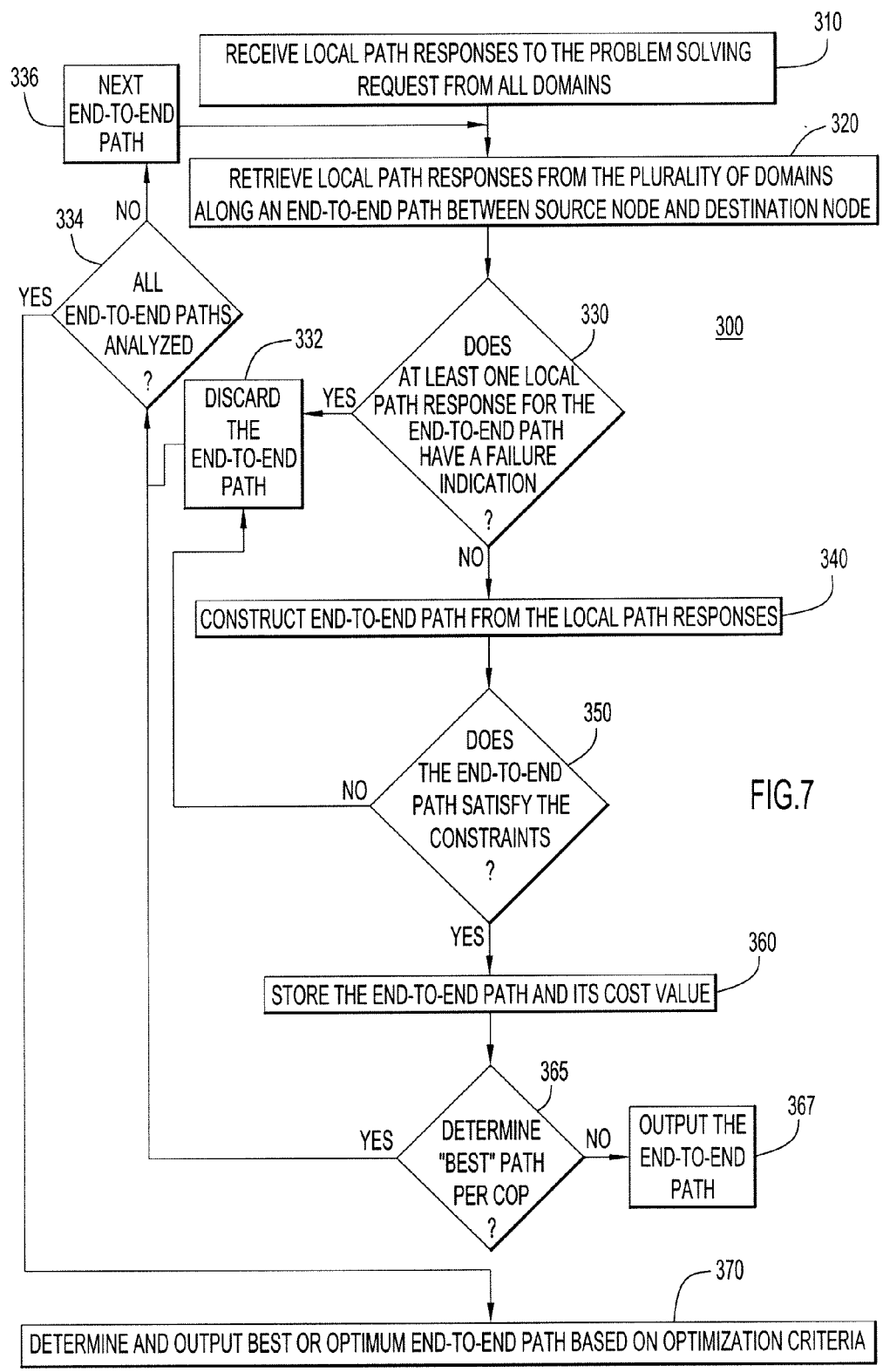
FIG. 7 is a flow chart of solution aggregation a path selection logic that is performed on the basis of local path solutions received in response to the problem solving request.

Turning now to FIG. 7, the solution aggregation and path selection logic 300 is now described. The logic 300 aggregates the local solutions received in responses sent by the logic 200 in nodes that received the request sent by logic 100 in a source node (master). As explained above, the logic 300 may be executed in the source node itself or in some other node or computing element in the source domain or some other domain.

Since the possible paths ("M") between the source node and destination node are determined at the time that the problem solving request is sent (using BGP, for example), the logic 300 performs analysis for local path solutions for each possible path after aggregating the received local path solutions. Generally, the logic 300 operates to receive the local path solutions and aggregates the solutions. In the case of a CSP, a satisfying path is found by connecting the solutions together using the edge links provided and making sure the constraints are satisfied. For a COP, the "best" of the resulting satisfying end-to-end paths is found. If any one of the domains along a path returns a failure in a local path solution, then that path does not satisfy the request and will be removed from consideration. If none of the paths can satisfy the request, then the logic 300 generates a failure to the source of the request.

At 310, the location path responses sent from a plurality of network domains in response to the problem solving request are received. At 320, for an end-to-end path between the source node and destination node (determined via BGP, for example, at the time that the problem solving request is generated), the local path responses are retrieved from the plurality of network domains. At 330, a determination is made as to whether at least one of the local path responses (retrieved at 320) for the end-to-end path has a failure indication. If so, then that end-to-end path is discarded at 332 and at 334, a determination is made as to whether all end-to-end paths have been analyzed. If not, then at 336, the next end-to-end path is invoked and the process goes to 320. When it is determined that all end-to-end paths have been analyzed, then the process goes to a final step as described hereinafter.

When no failure is found for a local path response for the end-to-end path at 330, then at 340 an end-to-end path is constructed from the local path responses retrieved at 320. That is, the local path solution responses are assembled together to build an end-to-end path. At 350, the end-to-end path constructed at 340 is analyzed to determine whether it satisfies the constraints C of the problem solving request. For example, the delays of each local path in the end-to-end path are added and compared with the global delay constraint value to determine whether the accumulated path delay is less than (or equal to) the global path delay constraint value. In the case of a bandwidth requirement, the bandwidth of each local path is examined to be sure that it can support the required bandwidth specified in the constraints C. If any local path in the constructed end-to-end path cannot support the required bandwidth, then that end-to-end path is discarded because it fails to meet the constraints C.

When at 350 the end-to-end path is determined not to satisfy the constraints, then the process goes to 332 and 334. When at 350 the path is determined to satisfy the constraints, then data representing the constructed end-to-end path is stored together with an associated cost value at 360. At 365, it is determined whether to search for the "best" path according to a COP. The logic may be configured to perform CSP analysis or COP analysis. When the logic is configured to solve a COP, then the process returns to 334 to continue for the next end-to-end path if there are still remaining paths to be analyzed. Otherwise, if the logic is not configured to solve a COP, then the process goes to 367 where the first end-to-end path determined to satisfy the constraints (at 350) is output and the process ends. Thus, when CSP analysis is performed, it is not necessary to analyze all of the end-to-end paths. The first end-to-end path that is determined to satisfy the constraints is output and the process 300 terminated.

On the other hand, when COP analysis is being performed, then the functions 320-365 are repeated until all end-to-end paths have been analyzed. After all of the end-to-end paths have been analyzed, then at 370, an optimization algorithm is applied to the end-to-end paths that were determined to satisfy the constraints in order to select the best end-to-end path (that satisfies the constraints) according to some optimization criteria.

The logic 300 may be summarized by the following pseudo-code.

1 For each path P from source domain to destination Ad known to source domain via BGP 2 Collect local results from a plurality of (e.g., all) the domains along the path P 3 If one local result returns failure, then skip to next path 4 Construct end-to-end paths by connecting the edge nodes of neighboring domains 5 For each path, check whether it satisfies the constraints 6 If yes, store the path and its cost value 7 End For 8 End For 9 If there is no stored path, return failure 10 Otherwise, return the "best" path of all the stored paths for a COP which is optional.

Figure 8:
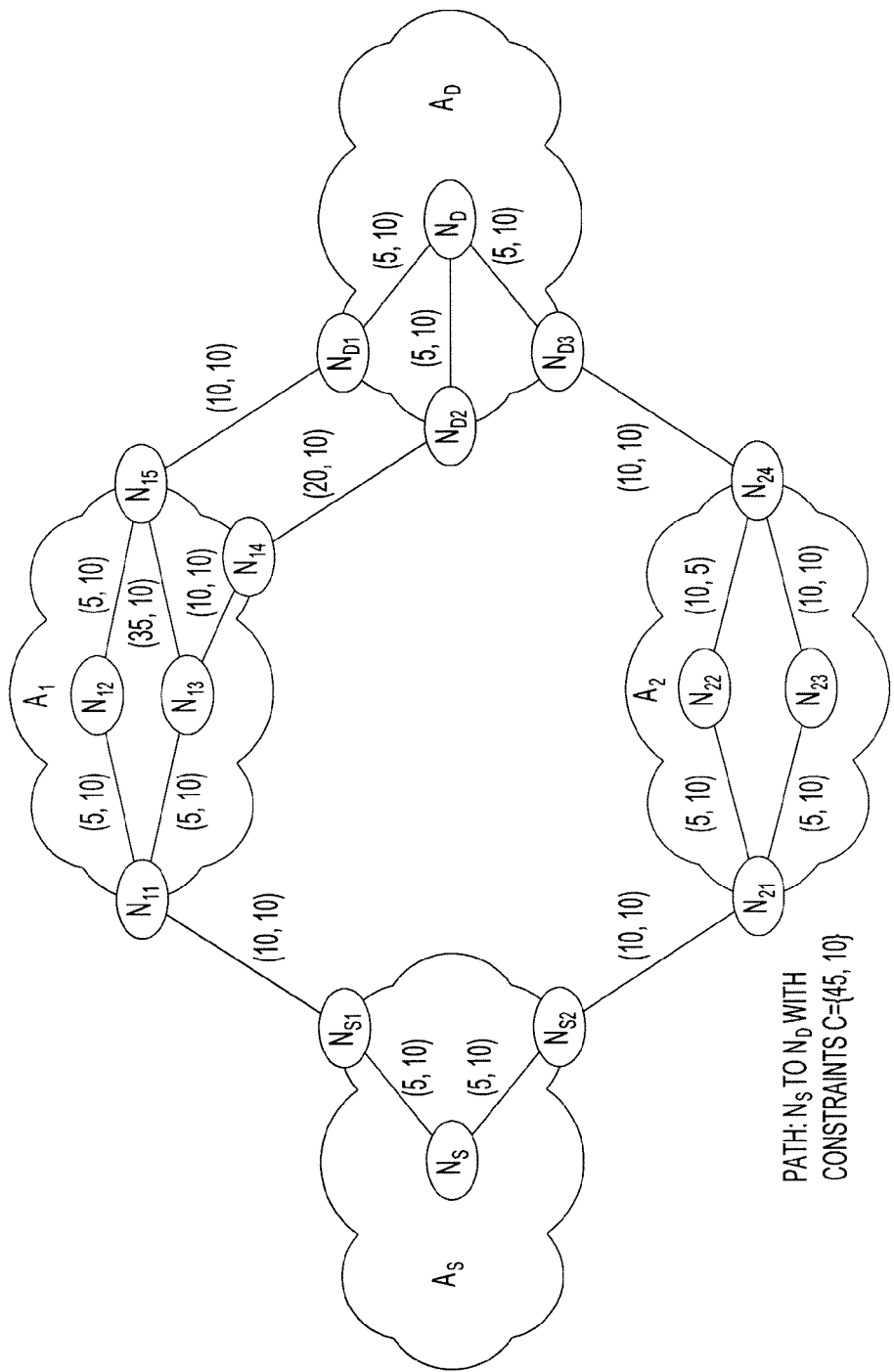
FIGS. 8 and 9 are network diagrams for an example scenario of the distributed constraints-based routing technique.
Figure 9:
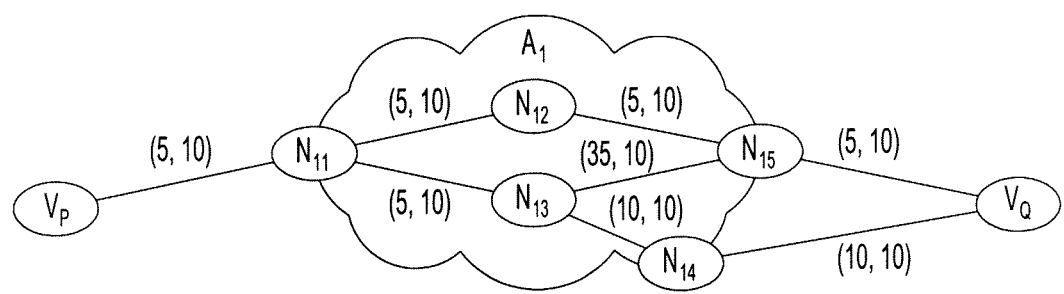

With reference to FIGS. 8 and 9, an example scenario is described for the distributed constraints-based routing technique. FIG. 8 shows a network topology with four different domains: $A_S$, $A_1$, $A_2$, and $A_D$. Each domain internally has a topology with nodes and links. Each link has an associated link delay and a maximum supported bandwidth denoted as (delay, bandwidth) in FIG. 8, where integer numbers are given for simplifying the explanation. Two domains are connected at their edge nodes. For example, domain As has three nodes, $N_S$, $N_{S1}$, and $N_{S2}$, and the links $N_S$ to $N_{S1}$ and $N_S$ to $N_{S2}$ have a delay of 5 ms, and support a maximum bandwidth of 10 Mbps, i.e., (5,10). The edge node $N_{S1}$ links domain $A_S$ to domain $A_1$ at edge node $N_{11}$, and the edge node $N_{S2}$ links $A_S$ to $A_2$ with its edge node $N_{21}$. One or more network node elements in each of the domains has a solver to locally handle the path decisions, and these solvers can communicate with other solvers in other domains.

The distributed constraints-based routing problem in this example is as follows: "Find a path from the source node $N_S$ in domain $A_S$ to the destination node $N_D$ in domain $A_D$ which satisfies the total delay constraint of D=45 ms, and the bandwidth constraint of B=10 Mbps".

Using BGP, the source node $N_S$ knows the following best paths to destination node $N_D$: Path 1—[As, A1, Ad], and Path 2—[As, A2, Ad]. The source node $N_S$ sends the following messages to the other domains as shown in Table 1.

TABLE 1

Problem solving request messages sent by the source node $N_S$ to the other domains.

| Path | Recipient Domain | Problem solving request message |
|---|---|---|
| 1 | $A_S$ | $(N_S, A_S, N_D, A_D, \{45, 10\}, [A_S, A_1, A_D])$ |
| 1 | $A_1$ | $(N_S, A_S, N_D, A_D, \{45, 10\}, [A_S, A_1, A_D])$ |
| 1 | $A_D$ | $(N_S, A_S, N_D, A_D, \{45, 10\}, [A_S, A_1, A_D])$ |
| 2 | $A_S$ | $(N_S, A_S, N_D, A_D, \{45, 10\}, [A_S, A_2, A_D])$ |
| 2 | $A_2$ | $(N_S, A_S, N_D, A_D, \{45, 10\}, [A_S, A_2, A_D])$ |
| 2 | $A_D$ | $(N_S, A_S, N_D, A_D, \{45, 10\}, [A_S, A_2, A_D])$ |

Each domain that receives a problem solving request message from the source node solves for local solutions applying the given required constraints using logic 200 described above in connection with FIGS. 4-6. The source node sends itself the problem solving request message because the source node also computes the local solutions.

When a node in a domain receives a problem solving request message, the node transforms its local topology to include the virtual nodes using the process as explained above in connection with FIGS. 5 and 6. For example, with reference to FIG. 9, a node in domain $A_1$ transforms the domain topology by introducing two virtual nodes $V_P$ and $V_Q$ for the message received from domain $A_S$ for Path 1, and solves for the local constraints problem to find all possible satisfying paths from $V_P$ to $V_Q$ that satisfy the global constraints C={40, 10}.

FIG. 9 shows that for the edge links, the delay to the virtual nodes is half of the total link delay to original edge links, while the bandwidth supported is same as before.

Examples of local results returned by a node in $A_1$ to the source domain is shown in Table 2 below.

TABLE 2

Local path solutions returned by domain $A_1$ to the source domain for Path 1.

| Potential Path | {D, B} | Constraints Satisfied? | Returned Local Path Solution |
|---|---|---|---|
| $[V_P, N_{11}, N_{12}, N_{15}, V_Q]$ | {20, 10} | Yes | $[(N_{S1}, N_{11}), \{20, 10\}, (N_{15}, N_{D1})]$ |
| $[V_P, N_{11}, N_{13}, N_{15}, V_Q]$ | {50, 10} | No | — |
| $[V_P, N_{11}, N_{13}, N_{14}, V_Q]$ | {30, 10} | Yes | $[(N_{S1}, N_{11}), \{30, 10\}, (N_{14}, N_{D2})]$ |

In the same manner, a node in domain $A_D$ returns $[(N_{15}, N_{D1}), \{10, 10\}, (N_{D1}, N_D)]$ and $[(N_{14}, N_{D2}), \{15, 10\}, (N_{D2}, N_D)]$ for Path 1, for the two potential paths it has from the domain $A_1$ to itself. The source node generates the local solution $[(N_S, N_{S1}), \{10, 10\}, (N_{S1}, N_{11})]$ for Path 1.

For Path 2, Table 3 below shows the potential paths for domain $A_2$ and shows what paths satisfy the constraints.

TABLE 3

Local solutions returned by domain $A_2$ to the source $A_S$ for Path 2.

| Potential Path | {D, B} | Constraints Satisfied? | Returned Local Path Solution |
|---|---|---|---|
| $[V_P, N_{21}, N_{22}, N_{24}, V_Q]$ | {25, 5} | No | — |
| $[V_P, N_{21}, N_{23}, N_{24}, V_Q]$ | {25, 10} | Yes | $[(N_{S2}, N_{21}), \{25, 10\}, (N_{24}, N_{D3})]$ |

Domain $A_D$ returns $[(N_{24}, N_{D3}), \{10, 10\}, (N_{D3}, N_D)]$ and domain $A_S$ generates $[(N_S, N_{S2}), \{10, 10\}, (N_{S2}, N_{21})]$ for Path 2.

The source domain $A_S$ now has all the local solutions returned by domains $A_1, A_2, A_D$, and also generated locally by it for the two paths.

The source node $N_S$ now aggregates the local solutions, one path at a time, by using the logic 300 explained above in connection with FIG. 7. Specifically, for Path 1, the source node aggregates the local path solution $[(N_S, N_{S1}), \{10, 10\}, (N_{S1}, N_{11})]$ from domain $A_S$, location path solution $[(N_{S1}, N_{11}), \{20,10\}, (N_{15}, N_{D1})]$ from domain $A_1$, and the location path solution $[(N_{15}, N_{D1}), \{10, 10\}, (N_{D1}, N_D)]$ from domain $A_D$ to construct an end-to-end path determines that this end-to-end path satisfies the global constraints (adding the individual delays 10+20+10=40 ms<D=45 ms) to determine that the global delay requirement is met and the global bandwidth requirement of 10 Mbps is met in all local paths.

However, for Path 1, the end-to-end path constructed from the location solutions $[(N_S, N_{S1}), \{10, 10\}, (N_{S1}, N_{11})]$ from domain $A_S$, $[(N_{S1}, N_{11}), \{30, 10\}, (N_{14}, N_{D2})]$ from domain $A_1$, and $[(N_{14}, N_{D2}), \{15, 10\}, (N_{D2}, N_D)]$ from $A_D$, is rejected or discarded because the global delay constraint is not met (10+30+15=55 ms>D=45 ms).

For Path 2, the end-to-end path constructed from the local solutions $[(N_S, N_{S2}), \{10, 10\}, (N_{S2}, N_{21})]$ from $A_S$, $[(N_{S2}, N_{21}), \{25,10\}, (N_{24}, N_{D3})]$ from domain $A_2$, and $[(N_{24}, N_{D3}), \{10, 10\}, (N_{D3}, N_D)]$ from domain $A_D$, with a total delay of 10+25+10=45 ms satisfies the global delay constraint, and also satisfies the bandwidth constraint of 10 Mbps.

For a CSP, either of the two end-to-end paths (or the path found first) described above in this example may be used because they both satisfy the global constraints. However for a COP, the best or optimum of the two paths may be selected. Comparing the two constructed end-to-end paths that satisfy the global constraints, the source node may apply an optimization algorithm using the cost of delay and bandwidth and choose the path with a smaller delay. In this case, the source node chooses the path generated using Path 1, which has a delay of 40 ms. The source node need not know the entire path, it just needs to know what domain to pick in its path, and within a domain it knows the ingress and the egress edge links of the best satisfying path.

The distributed constraints-based path computation techniques described herein improve over current methods in several ways. First, many proposed techniques that relate to QoS routing and traffic engineering are directed to intra-domain routing only. BGP is the de facto inter-domain routing protocol and it does not yet support QoS routing. Second, current approaches generally consider a single problem solving request only. Multiple requests are satisfied one by one in the order received. The drawback to this is that a solution to one earlier request may prevent some later request from being satisfied. However, if the requests are considered simultaneously, both may be satisfied. There are existing implementations to solve multiple requests, but they are generally done via offline planning or calculation. Third, centralized approaches for constraints-based problems do not scale well due to either the resource limitations at the solving engine or the unavailability of the global view of the problem. For example, in inter-domain routing, the intra-domain routes, link attributes such as delay, bandwidth, and intra-domain administrative policies may not be available to the plurality of domains.

The functions performed to generate and send the problem solving request (FIG. 3), and to receive and analyze the local path solution responses, may be performed by a network element, e.g., the source node itself, that also is configured to forward data in the network. Alternatively, these functions may be performed by a computing element connected to the network and configured only to monitor traffic in the network and which does not forward network traffic, but which otherwise has the necessary computing capabilities as described herein. Likewise, the elements in the other domains that receive and respond to the problem solving request may be network elements that are also capable of forwarding traffic in the network (e.g., nodes in the domain), or may be computing elements that are configured only to monitor traffic in the network (and not to forward traffic) but which have the necessary computing capabilities.

To summarize, the source domain of the traffic acts as a master and divides the routing solution problem by sending the problem solving request to a plurality of domains (including source domain and destination domain) along a path between the source domain and the destination domain. When the domains return their local path solutions to the source domain, the source domain aggregates the results and finds a path that satisfies the given constraints. The domains (including the source domain and the destination domain) solve the request locally first and return their local results to the master (source domain). In this way, the path computation problem is distributed to multiple sets of solvers in different domains, and then the results (loose paths) are aggregated to construct end-to-end paths. Consequently, the internal topology, local constraints and policies of each of the individual domain need not be shared with other domains while computing an inter-domain end-to-end path to determine whether the end-to-end path satisfies a set of constraints. The source domain has the final choice of selecting the best path from a set of possible paths received from other intermediary domains.

Although the techniques are illustrated and described herein as embodied in one or more specific examples, it is nevertheless not intended to be limited to the details shown, since various modifications and structural changes may be made therein without departing from the scope of and the range of equivalents of the claims.

What is claimed is:

1. A method comprising:
   for each path from a source node in a source domain to a destination node in a destination domain that is known to the source domain, sending a problem solving request to a plurality of intermediate network domains that have a potential path between the source node and the destination node, the problem solving request including one or more constraints associated with a routing function for traffic between the source node and the destination node, each intermediate domain comprising two or more nodes, and wherein the problem solving request comprises a message containing an identifier of the source node, an identifier of the destination node, an identifier of the source network domain, an identifier of the destination network domain, constraints criteria comprising total allowed delay and total required bandwidth from the source node to the destination node for the path, and an identifier of the path;
   in each intermediate domain that receives the problem solving request, generating a plurality of possible local path solutions for possible paths from a previous neighbor network domain to a next neighbor network domain, wherein the previous neighbor network domain is modeled as a single virtual network node and the next neighbor network domain is modeled is a single virtual network node;
   receiving local path solutions for each path from the plurality of intermediate domains in response to the problem solving request, the local path solutions representing possible paths through the respective domain that satisfy the one or more constraints;
   aggregating the received local path solutions;
   constructing one or more end-to-end paths from the aggregated local path solutions; and
   analyzing the one or more end-to-end paths constructed from the aggregated local path solutions to determine whether there is at least one end-to-end path from the source node to the destination node that satisfies the one or more constraints based on the local path solutions.

2. The method of claim 1, and further comprising outputting data describing the end-to-end path that is determined to satisfy the one or more constraints.

3. The method of claim 1, wherein constructing and determining are performed for each of a plurality of end-to-end paths, and further comprising determining an optimum one of the end-to-end paths that satisfy the one or more constraints based on optimization criteria.

4. The method of claim 1, and further comprising determining, for an end-to-end path, whether at least one local path solution has a failure indication, and if so, discarding the end-to-end path.

5. The method of claim 1, wherein generating comprises generating, for each local path solution, data representing an edge link to the previous neighbor network domain, a constraints value set comprising local available bandwidth and local path delay and an edge link to the next neighbor network domain.

6. The method of claim 1, wherein in each domain that receives the problem solving request, determining a plurality of possible paths from the previous neighbor network domain to the next neighbor network domain that satisfy the one or more constraints in the problem solving request and that also satisfy one or more local constraints.

7. The method of claim 1, wherein generating is performed by network elements that also forward data.

8. The method of claim 1, wherein generating the plurality of possible local path solutions is performed by computing elements that monitor network traffic but that do not forward network traffic.

9. The method of claim 1, wherein sending and determining are performed by the source node.

10. The method of claim 1, further comprising, prior to sending, determining a plurality of the possible paths between the source node and the destination node using an inter-domain routing protocol.

11. A network node apparatus comprising:
    a network interface unit configured to communicate messages over a network;
    a processor configured to be coupled to the network interface unit, wherein the processor is configured to:
      for each path from a source node in a source domain to a destination node in a destination domain that is known to the source domain, send a problem solving request message to a plurality of intermediate network domains that have a potential path between the source node in a first network domain and the destination node in a second network domain, the problem solving request message including one or more constraints associated with a routing function for traffic between the source node and the destination node, each intermediate domain comprising two or more nodes, and wherein the problem solving request comprises a message containing an identifier of the source node, an identifier of the destination node, an identifier of the source network domain, an identifier of the destination network domain, constraints criteria comprising total allowed delay and total required bandwidth from the source node to the destination node for the path, and an identifier of the path;

receive messages comprising local path solutions for each path in response to the problem solving request message, the local path solutions comprising data representing possible paths through the respective domain that satisfy the one or more constraints and which local path solutions, for each intermediate domain, describe possible paths from a previous neighbor network domain that is modeled as a single virtual network node and for possible paths to a next neighbor network domain that is modeled is a single virtual network node;

aggregate the received local path solutions;

construct one or more end-to-end paths from the aggregated local path solutions; and analyze the one or more end-to-end paths constructed from the aggregated local path solutions to determine whether there is at least one end-to-end path from the source node to the destination node that satisfies the one or more constraints based on the local path solutions.

12. The apparatus of claim 11, wherein the processor is configured to determine an optimum one of the plurality of end-to-end paths that satisfy the one or more constraints based on optimization criteria.

13. The apparatus of claim 11, wherein the processor is further configured to determine, for an end-to-end path, whether at least one local path solution has a failure indication, and if so, to discard the end-to-end path.

14. A system comprising the apparatus of claim 11, and further comprising an additional apparatus that comprises a network interface unit configured to communicate over the network, and a processor configured to be coupled to the network interface unit of the additional apparatus, wherein the processor of the additional apparatus is configured to receive the problem solving request message and to generate a plurality of possible local path solutions for possible paths through the respective domain from the previous neighbor network domain to the next neighbor network domain.

15. A non-transitory processor readable memory medium encoded with instructions that, when executed by a processor, cause the processor to:

for each path from a source node in a source domain to a destination node in a destination domain that is known to the source domain, send a problem solving request to a plurality of intermediate network domains that have a potential path between the source node and the destination node, the problem solving request including one or more constraints associated with a routing function for traffic between the source node and destination node, each intermediate domain comprising two or more nodes, and wherein the problem solving request comprises a message containing an identifier of the source node, an identifier of the destination node, an identifier of the source network domain, an identifier of the destination network domain, constraints criteria comprising total allowed delay and total required bandwidth from the source node to the destination node for the path, and an identifier of the path;

receive local path solutions for each path from the plurality of domains in response to the problem solving request, the local path solutions representing possible paths through the respective domain that satisfy the one or more constraints and which local path solutions, for each intermediate domain, describe possible paths from a previous neighbor network domain that is modeled as a single virtual network node and for possible paths to a next neighbor network domain that is modeled is a single virtual network node;

aggregate the received local path solutions;

construct one or more end-to-end paths from the aggregated local path solutions; and analyze the one or more end-to-end paths constructed from the aggregated local path solutions to determine whether there is at least one end-to-end path from the source node to the destination node that satisfies the one or more constraints based on the local path solutions.

16. The non-transitory processor readable medium of claim 15, and further comprising instructions that, when executed by the processor, cause the processor to determine an optimum one of the plurality end-to-end paths that satisfy the one or more constraints based on optimization criteria.

17. The non-transitory processor readable medium of claim 15, further comprising instructions that, when executed by the processor, cause the processor to determine, for an end-to-end path, whether at least one local path solution has a failure indication, and if so, to discard the end-to-end path.

18. A non-transitory processor readable medium encoded with instructions that, when executed by a processor, cause the processor to:

receive a problem solving request that includes one or more constraints associated with a routing function for traffic between a source node and a destination node;

generate local path solutions representing possible paths through a network domain from a previous neighbor network domain to a next neighbor network domain that satisfy the one or more constraints, the local path solution comprising data representing an edge link to the previous neighbor network domain, a constraints value set comprising local available bandwidth and local path delay and an edge link to the next neighbor network domain, and the previous neighbor network domain is comprised of two or more nodes and is modeled as a single virtual network node and the next neighbor network domain is comprised of two or more nodes and is modeled is a single virtual network node; and send the local path solutions to a network element that is configured to receive all local path solutions from a plurality of domains to allow the network element to determine whether there is at least one path from the source node to the destination node that satisfies the one or more constraints.

19. The non-transitory processor readable medium of claim 18, wherein the instructions that cause the processor to generate comprise instructions that cause the processor to determine a plurality of possible paths from the previous neighbor network domain to the next neighbor network domain that satisfy the one or more constraints in the problem solving request and that also satisfy one or more local constraints.

* * * * *